United States Patent [19]

Taureg et al.

[11] Patent Number: 4,982,808
[45] Date of Patent: Jan. 8, 1991

[54] VISCOUS SHEAR COUPLING

[75] Inventors: Herbert Taureg, Hennef; Heinz Klein, St. Augustin, both of Fed. Rep. of Germany

[73] Assignee: Viscodrive GmbH, Lohmar, Fed. Rep. of Germany

[21] Appl. No.: 455,850

[22] Filed: Dec. 19, 1989

Related U.S. Application Data

[63] Continuation of Ser. No. 149,139, Jan. 27, 1988, abandoned.

[30] Foreign Application Priority Data

Jan. 27, 1987 [DE] Fed. Rep. of Germany ....... 3702299

[51] Int. Cl.$^5$ .............................................. F16D 35/00
[52] U.S. Cl. ................................... 180/233; 192/58 B; 192/58 C; 280/248; 280/249; 475/89
[58] Field of Search ....................... 180/249, 248, 233; 192/58 B, 58 C; 475/89

[56] References Cited

U.S. PATENT DOCUMENTS

| 3,025,686 | 3/1962 | Lewis | 192/113 B X |
| 4,040,271 | 8/1977 | Rolt et al. | 192/58 B X |
| 4,096,712 | 6/1978 | Webb | 192/58 B X |
| 4,605,087 | 8/1986 | Ashauer et al. | 180/248 |
| 4,650,028 | 3/1987 | Eastman et al. | 180/248 X |
| 4,736,828 | 4/1988 | Diessner | 192/58 B |

FOREIGN PATENT DOCUMENTS

| 3702299 | 3/1988 | Fed. Rep. of Germany | 192/58 B |
| 98033 | 5/1987 | Japan | 192/58 B |
| 264826 | 2/1950 | Switzerland | 192/58 A |
| 939720 | 10/1963 | United Kingdom | 192/113 B |
| 1357106 | 6/1974 | United Kingdom | 192/58 B |
| 2193793 | 7/1987 | United Kingdom | |
| 2189753 | 11/1987 | United Kingdom | 180/249 |
| 2200434 | 8/1988 | United Kingdom | 192/58 B |

Primary Examiner—Mitchell J. Hill
Attorney, Agent, or Firm—Toren, McGeady & Associates

[57] ABSTRACT

A viscous shear coupling, comprising a first part in the form of a housing (2), a second part (3) disposed within the housing to define an annular closure therebetween, a first set of annular plates (11) in the enclosure secured for rotation with the first coupling part interleaved with the plates (12) of a second set of plates, secured for rotation with the second coupling part (3) and a viscous liquid at least partially filling the enclosure, wherein the plates are provided with through slots (13, 14) which are arranged so that parts of the slots move into and out of area of axial alignment as the sets of plates rotate relative to one another. The slots in one set of plates are inclined to the radii of the plates, while the slots in the other set of plates may be radial such that in one direction of rotation of the first set of plates relative to the second set of plates the axially aligned areas of the slots of two adjacent plates move inwardly towards said axis, and in the opposite direction of rotation of the first set of plates relative to the second of plates the axially aligned areas of the slots of two adjacent plates move outwardly away from said axis. The coupling is able to transmit differing torques according to the direction of relative rotation between the plates, so that it is useful for an inter-axle drive line in a four-wheel drive motor vehicle.

6 Claims, 5 Drawing Sheets

VISCOUS SHEAR COUPLING

This is a continuation of Ser. No. 07/149,139 filed Jan. 27, 1988 now abandoned.

BACKGROUND OF THE INVENTION

1. Field of the Invention

This invention relates to viscous shear couplings. Viscous shear couplings in accordance with the invention have particular, but not exclusive, application for use in the drive transmission of motor vehicles.

2. Description of Prior Art

A viscous shear coupling, an example of which is described in GB-PS No. 1357106, comprises a housing part; a hub part within the housing part, the parts being relatively rotatable about a common axis; a viscous liquid in the housing part; and first and second sets of annular plates in the housing part, the plates of the first set are secured for rotation with the housing part and being interleaved with the plates of the second set which are secured for rotation with the hub part.

Normally torque is transmitted between the housing part and a hub part of the coupling due to the shearing forces in the viscous liquid between adjacent plates, i.e. the coupling operates in the viscous mode. Viscous couplings are widely used in the drive transmissions of motor vehicles having four-wheel drive of the type known as a viscous transmission. In such a transmission there is a permanently driven axle and a viscous shear coupling is disposed in a drive line connected to the wheels of a second axle thereof. For example, the vehicle may have a forwardly mounted engine, gearbox, and conventional drive arrangement to the vehicle front wheels, with an additional power output from the gearbox leading to the longitudinal drive line and the rear axle of the vehicle, the viscous shear coupling being disposed in such longitudinal drive line. As long as the permanently driven front axle, due to a sufficiently high adhesion between tires and road surface, drives the vehicle with no or substantially no slip, there is practically no speed differential between the two parts of the viscous shear coupling, so that no torque is transmitted to the rear wheels. However, if one of the permanently driven front wheels spins due to lack of adhesion between tire and road surface, a speed difference is built up in the viscous shear coupling so that torque is transmitted to the rear wheels through the coupling. The rear wheels then participate in and take over traction for the vehicle.

With such a viscous transmission, problems can occur under braking. If the vehicle is braked sharply or on a slippery surface so that the front wheels of the vehicle are locked, the action of the viscous shear coupling will be to attempt also to lock the rear wheels and this is undesirable since if the rear wheels lock lateral stability of the vehicle is impaired. Therefore it has been proposed to include a one-way clutch unit in a viscous transmission, such that no torque is transmitted through the longitudinal drive line with the viscous shear coupling when the rear wheels overrun the front wheels. Clearly to provide such an additional clutch unit is expensive, and adds weight and complexity to the vehicle.

Accordingly, it is the object of the present invention to provide a viscous shear coupling which, by its design, has different torque transmitting characteristics according to which way torque is being transmitted through the unit. The desired effect, as described hereafter, it analogous to that of a one-way clutch, so that the above described difficulty under conditions of braking can be avoided without requiring a separate one-way clutch.

In U.S. Pat. specification No. 2,743,792 there is disclosed a rotary motion resisting device, which is a viscous shear coupling, wherein the faces of the plates are provided with grooves lying at an angle to radii of the plates. The grooves on the opposite faces of each plate are inclined in opposite directions to the radii of the plates, so that the grooves on the adjacent faces of adjacent plates angle in opposite directions. The object of providing such grooves is to produce a circulation of viscous liquid through the grooves in use, the liquid flowing in a closed circuit through the spaces between the plates in series, returning through grooves in the end surfaces of the housing of the device and crossed bores in the hub thereof. The object of this circulation of liquid is to cool the device in operation.

The teaching of U.S. Pat. No. 2,743,792, while being aimed at producing liquid circulation for cooling, does not address the object of the present invention.

SUMMARY OF THE INVENTION

According to the invention, the plates of a viscous shear coupling are provided with through slots, the slots in each plate of the first set thereof (the first slots) having radially outermost ends at or adjacent the out periphery of the plate and extending inwardly towards the axis of the coupling, and the slots in each plate of the second set thereof (the second slots) having inner ends at or adjacent the inner periphery of the plate and extending outwardly from said axis to a radial distance from said axis such that on relative rotation of the first and second plates areas of the first and second slots move into and out of axial alignment with one another, the first and second slots being relatively oriented such that in one direction of rotation of the first set of plates relative to the second set of plates the axially aligned areas of the slots of two adjacent plates will move inwardly towards said axis, and in the opposite direction of rotation of the first set of plates relative to the second set of plates the axially aligned areas of the slots of two adjacent plates will move outwardly away from said axis.

In a viscous shear coupling whose plates are provided with such relatively oriented slots, when the direction of rotation of the first set of plates relative to the second set of plates is such that the axially aligned areas of the slots move outwardly, the tendency is correspondingly to pump the viscous liquid in such aligned areas outwardly, whilst any gas present in the form of bubbles in the viscous liquid is displaced inwardly. The majority of the viscous liquid between the plates thus is disposed at a greater effective radius, so the torque transmissible by the coupling due to shear in the viscous liquid is at a relatively higher value. On the other hand, when the direction of rotation of the first set of plates relative to the second set of plates is such that the axially aligned areas of the slots of two adjacent plates move inwardly, the tendency is to displace the majority of the viscous liquid inwardly so that it is disposed at a lesser radius from the axis of the coupling. There is a corresponding decrease in the torque transmissible by the coupling in this sense.

If a viscous shear coupling according to the invention is disposed in the drive line of a vehicle with a viscous transmission as described above, such that the coupling can transmit its greater torque to the wheels of the non-permanently driven rear axle thereof, in the normal direction of forward motion of the vehicle, when the above described condition of braking occurs the coupling will only be able to transmit the lesser torque in the opposite direction. Such use of the viscous shear coupling achieves to some extent (although not completely since the coupling still transmits some torque in the opposite direction of its normal driving direction which will depend on the viscosity of the liquid used in the coupling and the extent to which the housing part has been filled with liquid) the result of providing a one-way clutch unit in the transmission, but without the expense and complexity of providing a separate clutch unit.

The necessary relative orientation of the slots to achieve the movement of the axially aligned areas thereof towards or away from the axis of the coupling when relative rotation occurs between the sets of plates may be achieved by arranging the first and/or the second slots to extend circumferentially of the respective plates as they extend radially thereof.

Only one of the sets of plates, i.e. the first plates or the second plates, need have slots which extend circumferentially of the plates as the slots extend radially thereof. The slots in the other sets of plates could extend radially therein. However, it would be possible for the slots in both sets of plates to extend circumferentially as they extend radially, such circumferential extent being in opposite senses in the two sets of plates, e.g. in mirror image of one another.

The circumferentially extending slots may each be straight, at an inclination relative to the radii of the respective plate. Such inclination may be between five degrees and forty-five degrees. However, the slots may alternatively be arcuate instead of straight.

The invention also provides a four-wheel drive motor vehicle, comprising a prime mover, front wheels directly driven from the prime mover and a drive line connecting the prime mover to the rear wheels, and a viscous shear coupling according to the invention as above described in the drive line, the viscous shear coupling being arranged such that, in the normal direction of driving of the vehicle, rotation of the front wheels faster than the rear wheels will cause rotation of the first set of plates of the coupling relative to the second set thereof in the direction to cause the axially aligned areas of the slots of the plates to move outwardly away from the axis of the coupling.

In such a four-wheel drive motor vehicle, the viscous shear coupling may be incorporated as a separate unit in the drive line. For example, it may be at the front or rear end of a propeller shaft assembly extending longitudinally of the vehicle. However, in another arrangement a viscous shear coupling may be incorporated in the rear axle of the vehicle, to take over the function of a differential gearing therein as well as that of controlling torque transfer between the front and rear wheels.

To do this, a viscous shear coupling may be provided comprising two hub parts within the housing part, and with the second set of annular plates comprising two groups thereof which a first group is rotationally fast with the first hub part and the other group is rotationally fast with the second hub part. The two hub parts would be connected to half shafts leading to the respective rear wheels.

BRIEF DESCRIPTION OF DRAWINGS

The invention will now be described by way of example with reference to the accompanying drawings, of which.

DESCRIPTION OF PREFERRED EMBODIMENTS

Figure 1:
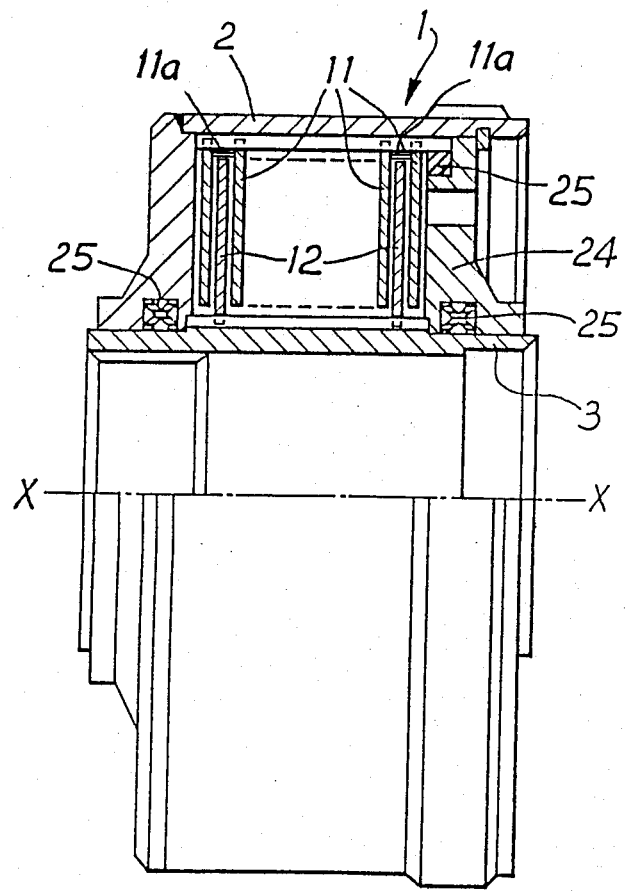
FIG. 1 is a longitudinal section through a fluid friction coupling according to the invention.

Referring firstly to FIG. 1, the viscous shear coupling 1 there shown comprises a first part in the form of a housing 2, within which is disposed a second part in the form of a hollow hub 3, so as to define an annular enclosure therebetween, closed by an annular cover 24. The housing is rotatable on the external surface of the hub part 3, and the enclosure is rendered fluid tight by seals 25.

In the enclosure there is disposed a plurality of annular plates, which comprise a first set of plates 11 interleaved with the plates 12 of a second set of plates. The plates 11 of the first set are secured for rotation with the housing 2, having engagement with the housing by way of circumferentially spaced teeth 23 at the outer periphery of each plate, engaging with internal axially extending teeth or splines in the housing 2. The plates 11 are held spaced from one another by spacing rings between the plates at the toothed outer peripheries thereof. The plates 12 of the second set are secured for rotation with the second coupling part provided by the hub 3, the plates 12 having internal teeth 23 engaging with axially extending external splines on the hub 3.

The space within the enclosure of the coupling which is not occupied by the plates 11, 12 is at least partially filled with a viscous liquid, e.g. a silicone oil. In FIG. 1, the cover 24 is shown with an aperture for filling the coupling with such liquid. In FIG. 1, the housing 2 is shown provided with external splines, and the hub 3 with internal splines for torque transmitting connection of these parts to respective rotary elements between which the coupling is to transmit torque when a difference in speed of rotation about the axis x—x of the coupling occurs between these parts. In known manner, the transmission of torque is due to shear in the viscous liquid between the two sets of plates 11, 12. The design of the plates 11, 12 is explained hereafter with reference to FIGS. 2 to 5 of the drawings.

Figure 2:
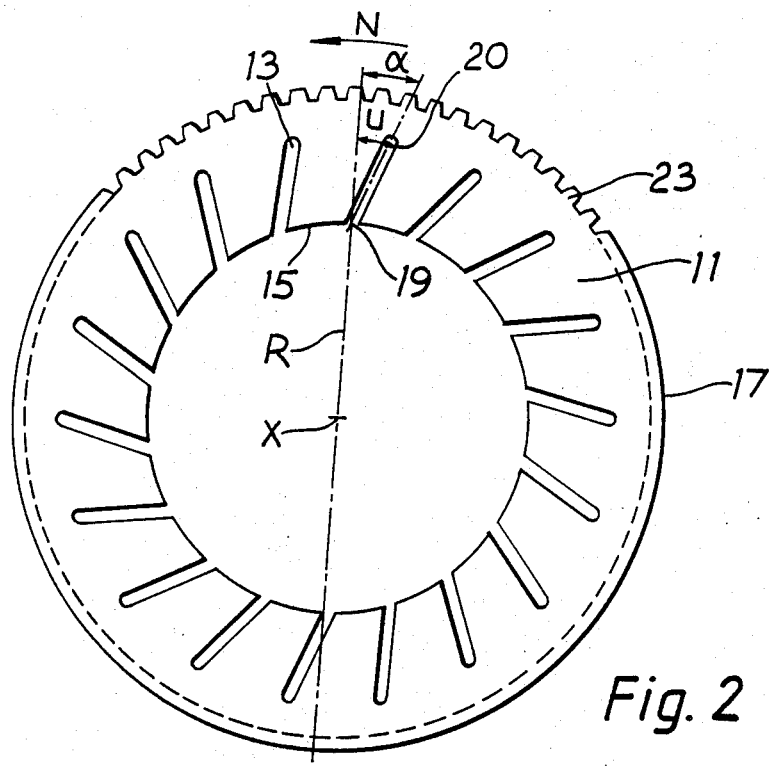
FIG. 2 is an axial view of one form of plate for the coupling of FIG. 1.

FIG. 2 shows in axial elevation one of the plates 11 which is secured for rotation with the housing 2. The outer periphery 17 of the plate is provided with circumferentially spaced teeth 23 which engage with the spline teeth inside the housing so that the plate is secured for rotation with the housing but axially movable relative thereto. The plate is provided with a plurality of circumferentially spaced outwardly extending slots 13, each of which extends outwardly from an open end 19 at the rotational axis X of the plate. The outermost end, 20, of each slot is closed, and each slot extends axially right through the plate. Each slot is inclined at an angle $\alpha$ to the radius R of the plate, such that the circumferential distance U of the slot from the radius R increases with increasing distance from the inner periphery 15 of the plate. If the normal direction of rotation of the plate is as indicated by the arrow N, each slot is inclined in the direction opposite to such direction of rotation.

The angle of inclination $\alpha$ of each slot is preferably in the range five degrees to forty-five degrees.

Figure 3:
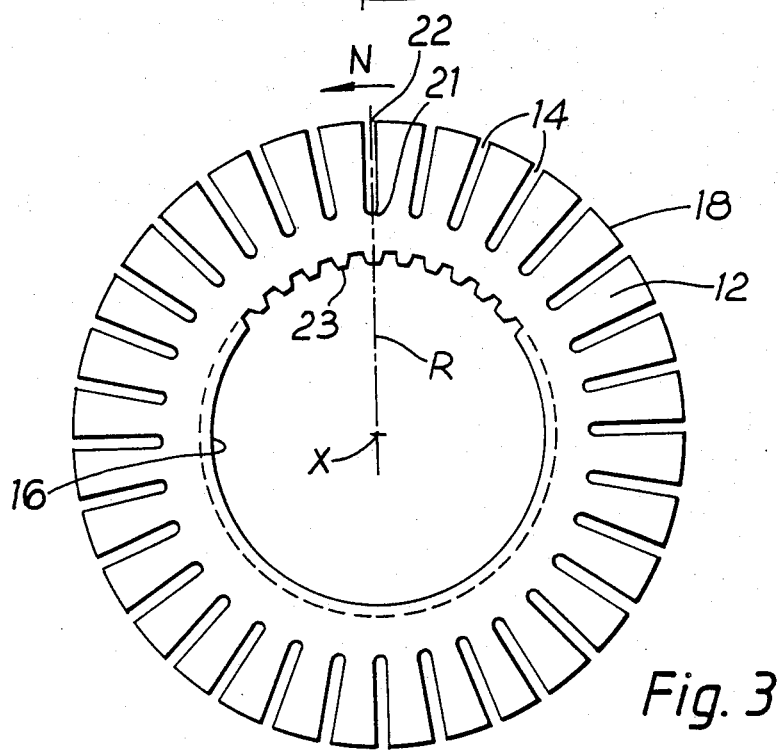
FIG. 3 is an axial view of a further form of plate for the coupling.

FIG. 3 shows one of the plates 12 of the second set thereof. This plate is rotationally fast with the hub part 3 of the coupling, and hence has its internal periphery 16 provided with circumferentially spaced teeth 23 engageable with the external spline teeth on the hub part 3. This plate is provided with slots 14 each of which extends radially inwardly from an open end 22 at the outer periphery 18 of the plate, to a closed end 21 approaching the inner periphery of the plate. Each of the slots 14 extends axially right through the plate.

Figure 5:
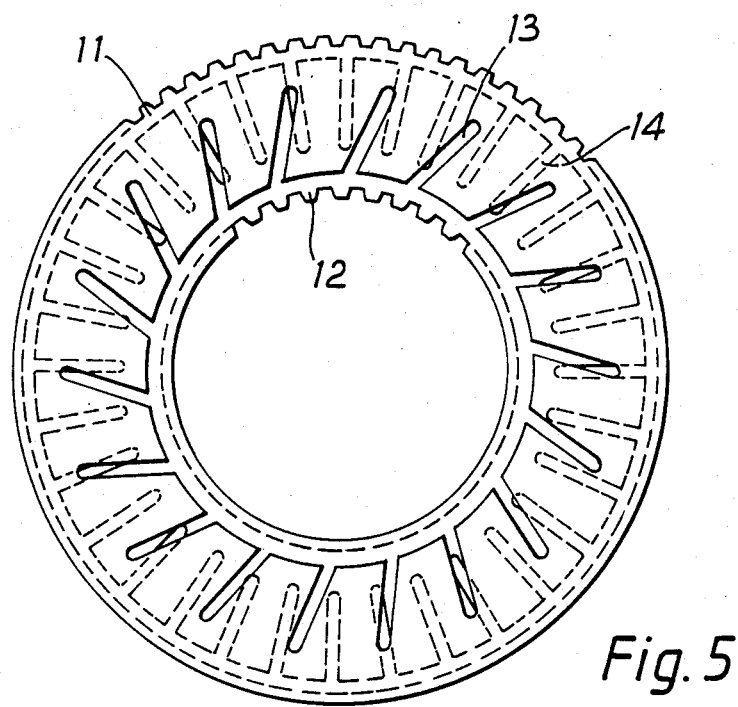
FIG. 5 is an axial view showing, superimposed, the plates of FIGS. 2 and 3.

In FIG. 5, a plate 11 is shown superimposed on a plate 12. It will be noted that, because slots 13 are inclined to the radial direction of the plate 11, while the slots 14 in the plate 12 extend radially, areas of the slots in the two plates are in alignment with one another although not every slot 14 has an area in alignment with a slot 13 because there are more of the former slots. It will further be appreciated that when the plate 11 moves in the direction of arrow N relative to plate 12, the instantaneous areas of alignment of the slots 13, 14 move radially outwardly. In the opposite direction of relative rotation between the plates, i.e. if plate 12 moves in a direction of arrow N relative to plate 11, the areas of alignment between the slots 13, 14 move radially inwardly.

In the former direction of relative rotation, the proportion of the viscous liquid in the areas of alignment of the slots during relative movement is also moved radially outwardly, with the effective radius pertaining to this proportion of the liquid, and thus the torque transferable from the first plate 11 to the second plate 12, growing accordingly. In the opposite direction of relative rotation, wherein the instantaneous areas of alignment of the slots move relatively inwardly, the transferable torque is correspondingly reduced. To summarize, if the first plates 11 lead relative to the second plates 12 in the main direction of rotation N, it is possible to transfer a higher torque between the plates than in the condition a higher torque between the plates than in the condition where the second plates 12 lead relative to the first plates 11. Thus there is produced a one-way clutching effect, permitting the second plates 12 to overtake the first plates 11 substantially without (or at least with a greatly reduced) torque transmission.

The coupling having plates 11, 12 as shown in FIGS. 2 and 3 would normally be installed in a transmission, e.g. a motor vehicle drive line, such that the housing 2 is connected to a driving element and the hub 3 to a driven element, to rotate in the direction N. Thus the normal mode of operation of the coupling is to provide high torque transfer with the first plates 11 leading the second plates 12, with reduced torque transfer if the second plates 12 overtake the first plates 11.

Figure 4:
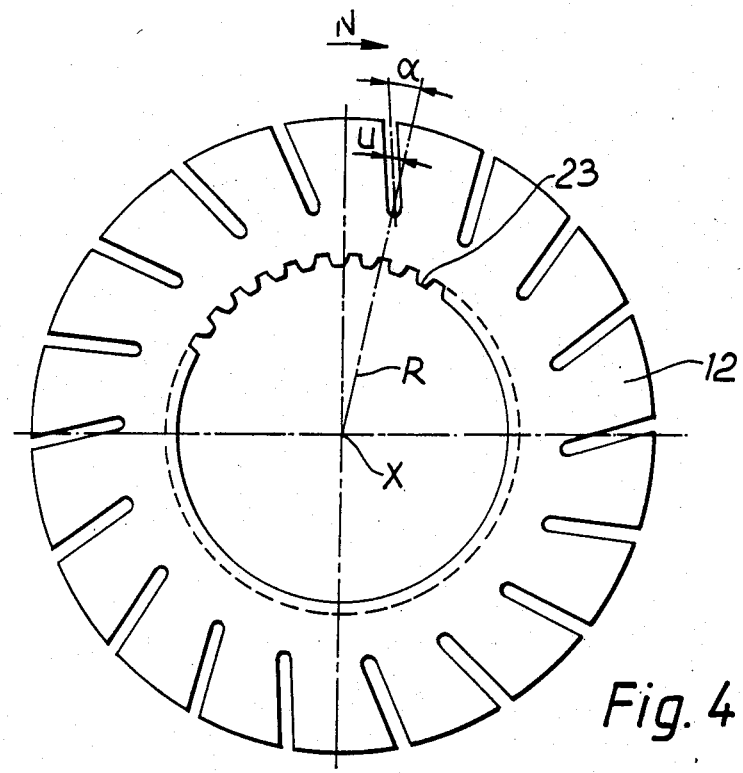
FIG. 4 is an axial view of yet another form of plate for the coupling.

An analogous effect can be achieved in the opposite sense, e.g. if the shaft part 3 is connected to a driving element and the housing part 2 to a driven element. FIG. 4 shows a configuration of plate 12 for connection to the shaft part 3 of the coupling in this case, intended for a main direction of rotation N which is clockwise in the drawing. The internal periphery of the plate is provided with teeth 23, and the plate is provided with slots extending inwardly from the external periphery thereof. Each slot is straight and inclined to the radius R of the plate at an angle $\alpha$, such that the circumferential distance U of the slot from the radius through the innermost end thereof increases with increasing distance from the axis of rotation X of the plate.

A plate as shown in FIG. 4 would be used in a coupling with plates connected to the housing of the coupling, which plates have radial slots starting at or adjacent the innermost periphery of such plates and ending near the outer periphery thereof. By analogy with the above description relating to FIG. 5, when the plates 12 overrun the plates connected to the outer part of the coupling in the direction N, in FIG. 4 the areas of alignment of the slots move radially outwardly, whilst when the outer part of the coupling overruns the inner part the areas of alignment move radially inwardly. The above described difference in the transferred torque is thus obtained.

In the above examples, the slots are shown as straight slots, with those in the plates of one set inclined to the radii thereof and those in the plates of the other set radial. Instead of straight inclined slots, slots of arcuate configuration could be used. The two sets of plates could be provided with straight or arcuate slots extending in opposite circumferential directions. The difference in the torque transmitted by the coupling is achieved as long as in one direction of relative rotation between the plates the instantaneous areas of alignment of the slots move radially outwardly, whilst in the opposite direction of relative rotation the areas of alignment move radially inwardly.

Figure 6:
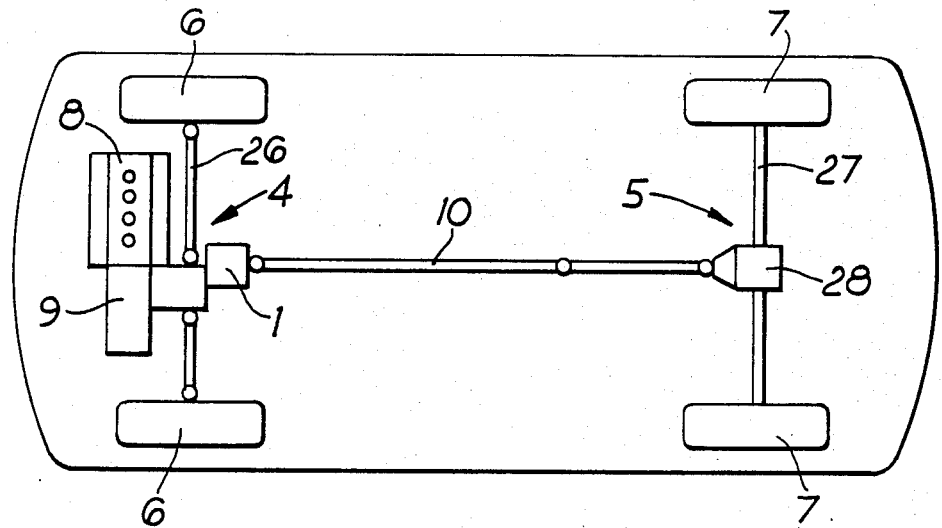
FIG. 6 shows diagrammatically the disposition of a coupling according to the invention in the driveline of a four wheel drive motor vehicle.
Figure 7:
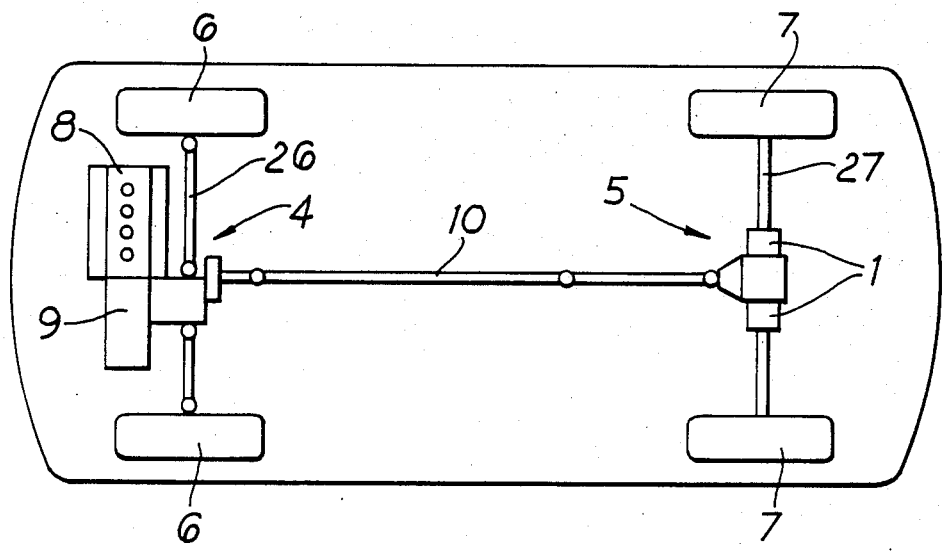
FIG. 7 shows diagrammatically how a coupling according to the invention may be disposed in an axle of a vehicle.

FIGS. 6 and 7 of the drawings show diagrammatically how a viscous shear coupling according to the invention could be utilized in a motor vehicle. Referring firstly to FIG. 6, the vehicle there shown has a front axle assembly 4 and a rear axle assembly 5, the front axle assembly having wheels 6 which are directly driven through drive shafts 26 from an engine 8 and gearbox 9. A conventional differential is provided between the drive shafts 26. There is a further power output from the gearbox 9 which is connected, by way of a viscous shear coupling 1 according to the invention and a longitudinal propeller shaft assembly 10, to a differential 28 at the rear axle 5, from which the rear wheels 7 are drivable by half shafts 27. The viscous shear coupling 1 according to the invention would be arranged so that in the normal direction of travel of the vehicle the maximum torque can be transmitted from the output of the transmission 9 to the propeller shaft 10, when the former overruns the latter. In the opposite sense, however, the above described one-way clutch effect occurs.

The transmission ratios in the arrangement are such that when the vehicle is driven on a road surface offering high adhesion, the directly driven front wheels 6 grip the surface and the rear wheels follow at substantially the same speed, i.e. there is no relative slipping between the front and rear wheels. There is then no significant difference in speed between the two sets of plates in the viscous shear coupling 1, so no torque is transmitted to the rear wheels 7. If, however, the directly driven wheels 6 slip, a speed differential exists in the viscous shear coupling so that torque is transmitted to the rear wheels and the vehicle drives with four wheel drive. If the vehicle is braked heavily so that the front wheels 6 lock, whilst the rear wheels continue to turn, the viscous shear coupling is then operated in the mode wherein there is much reduced torque transfer through the viscous shear coupling so that the rear wheels 7 can continue to turn even if the front wheels remain locked. Thus, stability of the vehicle is maintained.

In FIG. 7, there is shown a vehicle transmission layout which differs from that of FIG. 6 in that a viscous shear coupling 1 according to the invention is provided at the rear axle 5, to take over the function of the differential 28 therein as well as that of controlling torque transfer between front and rear axles. The viscous shear coupling has the additional function of compensating for the difference in the distance travelled by the rear wheels 7 in a curve. For this purpose, either a separate viscous shear coupling 1 could be associated with each half shaft 27, such couplings being driven from a common input, e.g. a crown wheel and pinion arrangement, or else a viscous shear coupling could be provided with three sets of plates, i.e. a first set of plates (as plates 11) and two second groups of plates (as plates 12). In such a coupling, one set of plates would be in driving connection with the longitudinal propeller shaft 10, whilst the other two groups of plates are in operating connection with the respective half shafts. The one-way clutching effect of the coupling would be achieved in manner analogous to that above described.

Figure 8:
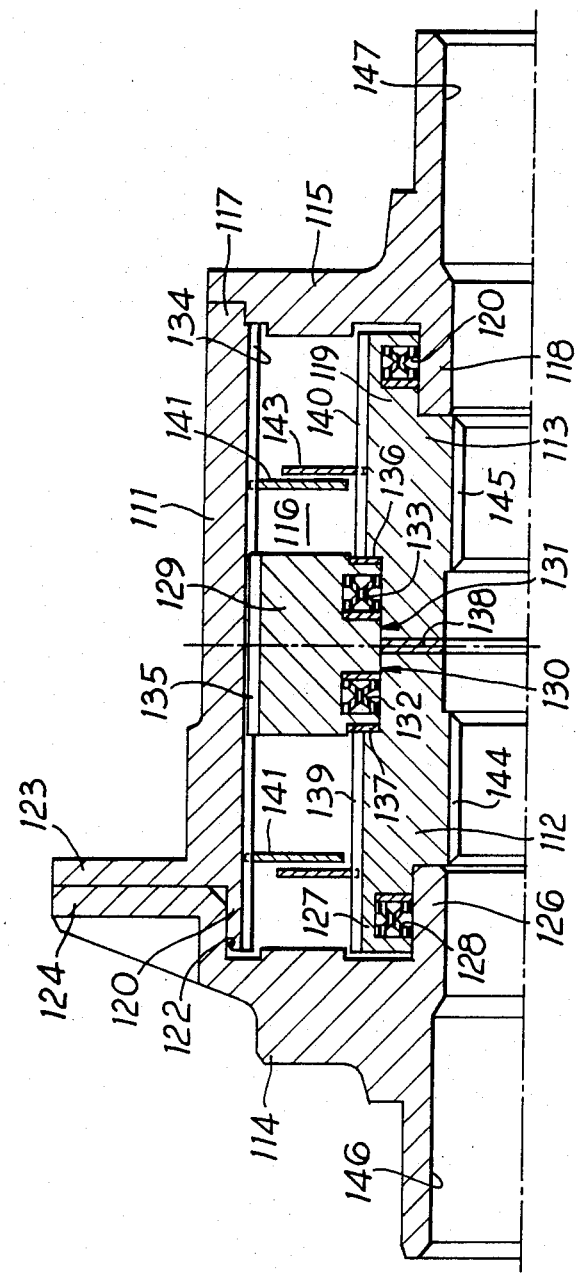
FIG. 8 is a section through a coupling according to the invention for disposition in an axle in the manner of FIG. 7.

FIG. 8 of the drawings shows a coupling suitable for disposition in the rear axle 5, having three sets of plates. The coupling comprises a housing 111 and two inner hub parts 112 and 113. The housing and hub parts form, with left and right hand cover members 114 and 115, an enclosure 116.

The right hand end of the housing 111 fits into a rebate or peripheral recess 117 in the cover member 115 which has an inwardly extending projection 118 which overlaps a reduced thickness outer end portion 119 of the hub part 113. A ring seal 120 seals the portion 119 to the projection 118 allowing the hub part 113. A ring seal 120 seals the portion 119 to the projection 118 allowing the hub part 113 to rotate relative to the cover member 115 in a fluid tight manner.

The left hand end of the housing 111 has a reduced diameter portion 122 which fits in a rebate or recess 122 in the cover member 114. The housing or drum 111 has a flange 123 which mates with a flange 124 on the cover member 114. The housing also has a cylindrical seat 125 to receive a crown gear, not shown, which may be bolted to the coupling with bolts passing through the flanges 123 and 124 or, if desired, the flange 123 only.

The cover member 114 has an inwardly extending projection 126 which overlaps a reduced thickness outer end portion 127 of the hub part 112 and is sealed thereto by a ring seal 128 so that the hub part 112 can rotate relative to the cover member 114 in a fluid tight manner.

A common central member 129 of annular shape is received in the enclosure and overlaps reduced diameter inner end portion 130 and 131 of the hub part 112 and 113 respectively. The central member is sealed to the hub parts by ring seals 132 and 133 respectively which seal the central member to the hub parts so that the latter can rotate relative thereto in a fluid tight manner.

The inner surface of the housing 111 is splined at 134 and the outer periphery of the member 129 is splined at 135 to mate with the splines 134. The member 129 is located on the hub parts by rings 136 and 137.

A thrust ring 138 is received between the juxtaposed inner ends of the hub parts 112 and 113. The latter have external splines 139 and 140. Plates 141 are splined to the splines 134 and are interleaved with plates 142 and 143 splined to the splines 139 and 140 respectively. The enclosure is partially filled with a viscous liquid. Conveniently it may be filled to about 80% of its total volume. Fluid is prevented from escaping from the enclosure by the ring seals 120, 128, 132 and 133 which nevertheless allow the hub parts 112 and 113 to rotate relative to each other and to the assembly of the housing 111 and the cover members 114 and 115.

The bores of the hub parts 112 and 113 have internal splines at 144 and 145 and receive the inner ends of axle shafts, not shown in FIG. 8, which pass through bores 146 and 147 in the cover members 114, 115 to drive the rear wheels 7.

In this coupling, the plates 141 could be as the plates 11 shown in FIG. 2 of the drawings, whilst the plates 142, 143 would be as the plates 12 shown in FIG. 3 of the drawings. Thus the necessary transfer of torque to the rear wheels of the vehicle can be achieved if the front wheels spin, with a correspondingly reduced transfer of torque in the opposite direction if the front wheels lock during braking.

We claim:

1. A viscous shear coupling, comprising a housing; a hub mounted within the housing for rotation relative to the housing about an axis in first and second opposite directions; a viscous liquid in the housing; and first and second sets of annular plates in the housing with each of said plates having a radially outer periphery and a radially inner periphery, the plates of the first set being mounted on and rotatable with the housing, spacing rings between the outer peripheries of adjacent plates of said first set, spacing said adjacent plates apart, said plates of said first set being interleaved with the plates of the second set which are mounted on and rotatable with the hub, each plate in the first set of plates having a plurality of circumferentially spaced first slots each having an inner end at least adjacent to the inner periphery of the plate and extending outwardly from said axis and each plate in the second set of plates having a plurality of circumferentially spaced second slots having outer ends at least adjacent to the outer periphery of the plate and extending inwardly towards said axis, lengths of the first and second slots from said inner and outer ends respectively being such that the slots overlaps so that parts of said first slots move into and out of axial alignment with parts of said second slots upon rotation of the hub relative to the housing, one of said inner and outer ends of each slot in each plate of at least one of said sets of plates being displaced circumferentially of a radius of said plate passing through the other one of said inner and outer ends, such that in said first direction of rotation of said hubs relative to the housing the axially aligned parts of the slots of adjacent plates of said first and second sets move inwardly towards said axis to pump said viscous liquid towards said axis thus minimizing the torque transmitted by the coupling, and in said second direction of rotation of the hub relative to the housing the axially aligned parts of the slots of adjacent plates of said first and second sets move outwardly away from said axis to pump said viscous liquid outwardly from said axis to maximize the torque transmitted by the coupling.

2. A viscous shear coupling according to claim 1, wherein only in the plates of one of said sets of plates are said inner and outer ends of the slots displaced circumferentially of a radius of said plate passing through one of said inner and outer ends, the slots in each plate of the other said set extending radially with respect to said axis.

3. A viscous shear coupling, comprising a housing; a hub mounted within the housing for rotation relative to the housing about an axis in first and second opposite directions; a viscous liquid in the housing; and first and second sets of annular plates in the housing with each of said plates having a radially outer periphery and a radially inner periphery, the plates of the first set being mounted on and rotatable with the housing, spacing rings between the outer peripheries of adjacent plates of said first set spacing said adjacent plates apart, said plates of said first set being interleaved with the plates of the second set which are mounted on and rotatable with the hub, each plate in the first set of plates having a plurality of circumferentially spaced first slots each having an inner end at least adjacent to the inner periphery of the plate and extending outwardly from said axis and each plate in the second set of plates having a plurality of circumferentially spaced second slots having outer ends at least adjacent to the outer periphery of the plate and extending inwardly towards said axis, lengths of the first and second slots from said inner and outer ends respectively being such that the slots overlap so that parts of said first slots move into and outer of axial alignment with parts of said second slots upon rotation of the hub relative to the housing, each slot in each plate of at least one of said sets of plates being straight between said inner and outer ends thereof and being at an angle to a radius from said axis so that one of said inner and outer ends are displaced circumferentially relative to a radius of said plate passing through the other one of said inner and outer ends of the plate, such that in said first direction of rotation of the hub relative to the housing the axially aligned parts of the slots of adjacent plates of said first and second sets move inwardly toward said axis to pump said viscous liquid towards said axis thus to minimize the torque transmitted by the coupling, and in said second direction of rotation of the hub relative to the housing the axially aligned parts of the slots of adjacent plates of said first and second sets move outwardly away from said axis to pump said viscous liquid outwardly from said axis to maximize the torque transmitted by the coupling.

4. A viscous shear coupling according to claim 3, wherein each said slot which is straight between said inner and outer ends thereof, lies at an angle of between five degrees and forty-five degrees to said radius.

5. A four wheel drive motor vehicle, comprising a prime mover, front wheels directly driven by the prime mover, and rear wheels connected to the prime mover by a drive line having first and second parts, a viscous shear coupling inserted between said first and second parts and having a housing connected to said first part and a hub connected to said second part and mounted within the housing for rotation relative to the housing about an axis in first and second opposite directions; a viscous liquid in the housing; and first and second sets of annular plates in the housing, the plates of the first set being mounted on and rotatable with the housing and being interleaved with the plates of the second set which are mounted on and rotatable with the hub, each plate in the first set of plates having a plurality of circumferentially spaced first slots each having an inner end at least adjacent to the inner periphery of the plate and extending outwardly from said axis and each plate in the second set of plates having a plurality of circumferentially spaced second slots having outer ends at least adjacent to the outer periphery of the plate and extending inwardly towards said axis, length of the first and second slots from said inner and outer ends respectively being such that the slots overlap so that parts of said first slots move into and outer of axial alignment with parts of said second slots upon rotation of the hub relative to the housing, one of said inner and outer ends of each slot in each plate of at least one of said sets of plates being displaced circumferentially relative to a radius of said plate passing through the other one of said inner and outer ends of plate such that in said first direction of rotation of the hub relative to the housing caused by rotation of the rear wheels faster than the front wheels when the vehicle is moving forwardly the axially aligned parts of the slots of two adjacent plates of said first and second sets move inwardly towards said axis to pump said viscous liquid towards said axis to minimize the torque transmitted by the coupling, and in said second direction of rotation of the hub relative to the housing caused by rotation of the front wheels faster than the rear wheels when the vehicle is moving forwardly the axially aligned parts of the slots of two adjacent plates of said first and second sets move outwardly away from said axis to pump said viscous liquid outwardly from said axis to maximize the torque transmitted by the coupling.

6. A four wheel drive motor vehicle according to claim 5, comprising a differential between said rear wheels, half shafts connecting the differential to the rear wheels and said drive line connecting the prime mover to the differential.

* * * * *